United States Patent

[11] 3,590,987

| [72] | Inventors | Dewey M. Evans<br>Farmington;<br>Peter J. Manetta, Warren, both of, Mich. |
|---|---|---|
| [21] | Appl. No. | 858,835 |
| [22] | Filed | Sept. 17, 1969 |
| [45] | Patented | July 6, 1971 |
| [73] | Assignee | Simplex Corporation<br>Detroit, Mich. |

[54] LIFT AND CARRY ACCUMULATOR
10 Claims, 3 Drawing Figs.

| [52] | U.S. Cl. | 198/219 |
|---|---|---|
| [51] | Int. Cl. | B65g 25/04 |
| [50] | Field of Search | 198/19, 34, 218, 219 |

[56] References Cited
UNITED STATES PATENTS
3,355,008  11/1967  Milazzo....................... 198/219

*Primary Examiner*—Edward A. Sroka
*Attorney*—Whittemore, Hulbert & Belknap

ABSTRACT: An accumulator system including a walking beam transfer bar having a plurality of part carriers movable thereon between idle and carrying positions. Part sensors are provided at each of a plurality of stations and means responsive to the position of the part sensors elevate selected carriers to part carrying position during initial forward movement of the transfer bar. Means interconnect the part carriers so that all carriers in rear of an empty station are shifted to part carrying position.

PATENTED JUL 6 1971

3,590,987

INVENTORS
DEWEY M. EVANS
PETER J. MANETTA
BY Whittemore
Hulbert & Belknap
ATTORNEYS

LIFT AND CARRY ACCUMULATOR

CROSS-REFERENCE TO RELATED APPLICATION

The accumulator disclosed herein is related to an accumulation disclosed in prior application of P. J. Manetla Ser. No. 763,819, filed Sept. 30, 1968.

BRIEF SUMMARY OF THE INVENTION

The accumulator herein operates to lift workpieces from a plurality of stations along a line, to advance them in elevated position to the next succeeding station, and to lower them in positions at the next succeeding station.

The apparatus comprises a plurality of work supports or perches which are independently movable on an elongated support bar between idle and work carrying positions. The individual work supports which are to advance workpieces are elevated into work carrying position by means operated during initial forward movement of the transfer bar. After the selected work supports have been moved to work carrying position the transfer bar itself is elevated carrying all work supports thereon with it. Thus, work supports which have been preset to work carrying positions are effective at this time to lift workpieces from the associated stations, while the work supports which have been left in idle position remain below workpieces which may be at associated stations.

Means are provided at each station to determine whether or not a workpiece is present at such station. The means for moving the work supports from idle to work carrying positions are responsive to the means for sensing the presence or absence of a workpiece at each station. The parts are constructed and arranged so that all workpieces to the rear of the foremost empty station are lifted and advanced and deposited at the preceding station.

DETAILED DESCRIPTION

The accumulator conveyor comprises an elongated stationary support which may conveniently be formed of two parallel rails. A reciprocating slide is provided and conveniently, may comprise a pair of elongated frame members which carry work supports movably mounted thereon.

Since, in general, the two rails making up the support are identical, and since the frame members making up the slide are identical, it is simpler to illustrate only one support member and one frame member of the slide. This will afford a complete understanding of the arrangement and operation of the mechanism.

The elongated stationary support is illustrated at 10 and mounted thereon are work locating and supporting elements 12 and 13 which together define a plurality of stations here designated A, B and C.

Figure 1:
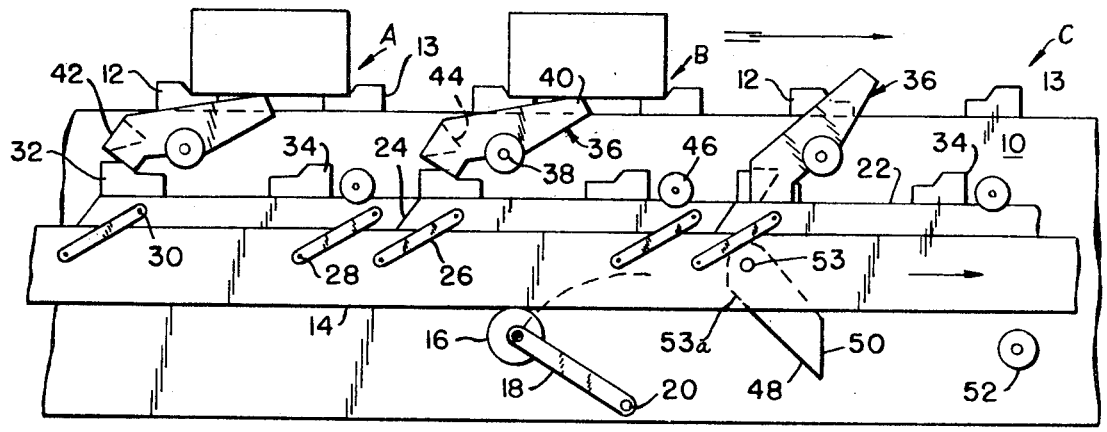
FIGS. 1, 2 and 3 are diagrammatic elevational views showing the accumulator in successive positions.

An elongated transfer bar 14 is provided which is supported in a lower position illustrated in FIG. 1 by a plurality of rollers 16 only one of which is illustrated in the Figures. The rollers 16 are mounted on elevating arms 18 which are pivoted to the frame as indicated at 20 and which are adapted to be swung from the position illustrated in FIG. 1 to the elevated position illustrated in FIG. 3 to elevate the transfer bar 14 to a position in which the work supports carried thereby will engage and lift workpieces W from the stations provided by the work supporting elements 12.

Individually movable work supports are provided on the transfer bar 14 and these comprise support segments 22, the forward and rear ends of which are inclined as indicated at 24 which are in abutment as illustrated in FIG. 1. Each of the support segments 22 is mounted by parallel links 26 to the transfer bar 14. The lower ends of the links are pivotally connected to the transfer bar as indicated at 28, and the upper ends of the links are pivotally connected to the work support segments as indicated at 30. Each of the support segments 22 is provided with a pair of work locating and supporting elements 32 and 34 essentially similar to the work supporting elements 12 and 13 provided on the frame bar 10.

Adjacent each of the stations there is provided a part sensor 36, the sensors being pivoted to the frame as indicated at 38. Each sensor 36 includes an arm 40 in position to be engaged by a workpiece at the station, and an arm 42 carrying a laterally extending block 44 which is in position to be abutted by a roller 46 carried by each support segment 22.

Figure 2:
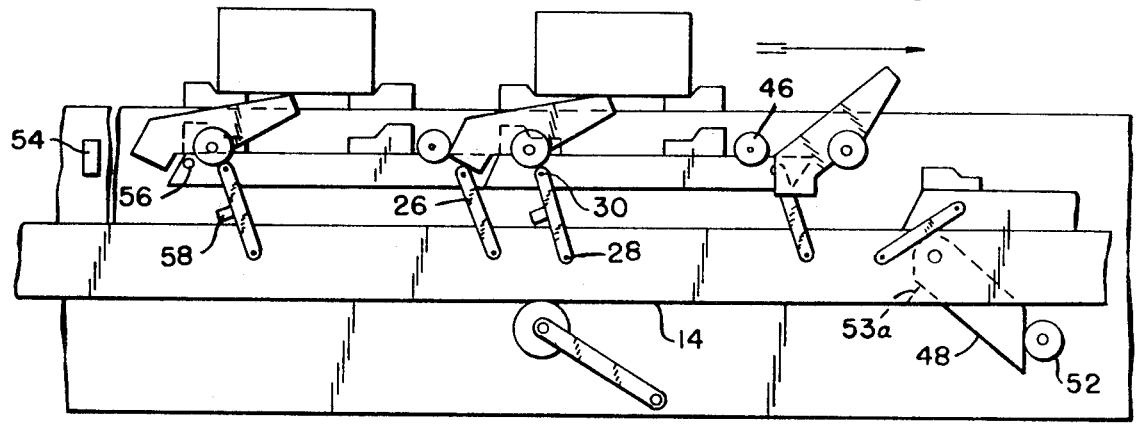

Carried by the transfer bar 14 is a stop 48 having a vertical forward face 50 which is adapted to abut a stationary stop roll 52 mounted in fixed position on the frame 10. The stop 48 is pivoted as indicated at 53 and its clockwise movement is limited by an abutment 53a for a purpose which will presently appear. Suitable means (not shown) is provided for effecting longitudinal movement of the transfer bar 14. This means may be in the form of a fluid actuated piston and cylinder device and is effective to move the transfer bar 14 in a direction to the right, as seen in FIG. 2, until the stop 48 engages the stop roller 52. At this time, although pressure may continue to be applied to the transfer bar 14 by the piston and cylinder device, further movement of the bar is prevented until the bar is elevated, as will subsequently be described.

The frame 10 is provided with an abutment 54 which cooperates with an abutment 56 on the support segment 22 located at the left of the apparatus, as seen in FIG. 2. In this Figure the relative location of the abutments 54 and 56 is indicated but it is to be understood that these abutments are in fact provided adjacent the end of the apparatus at which new parts are supplied for advancement to the right.

Suitable means are provided for effecting rotation of the arms 18 carrying the bar supporting rollers 16 for the purpose of raising and lowering the transfer bar 14 at appropriate points during the cycle.

OPERATION

With the foregoing description in mind, assume that the first empty station on the frame 12 from the discharge or delivery end thereof, is the station C. Accordingly, the parts sensor 36 at this station occupies the position shown in FIG. 1, the sensor being designed to swing by gravity to the illustrated position when no workpiece is at the associated station.

Inasmuch as station C is empty, it is possible to advance the workpiece from stations A and B as well as workpieces located at all stations to the left of station A. This is of course because that while the station B is presently occupied, the workpiece thereat will be advanced to the station C while the workpiece at the station A is being advanced to the station B.

Due to the presence of the workpiece at the station B, it will be observed that the part sensor 36 is in a position such that the block 44 thereon is located above the horizontal plane containing the roller 46 carried by the support segment located at the station A.

At this time fluid under pressure is admitted to the piston and cylinder device to move the transfer bar 14 in the direction of the arrow thereon, as seen in FIG. 1. The initial movement of the transfer bar will bring the roller 46 at the station B into engagement with the block or abutment 44, and further movement of the transfer bar will cause the support segment 22 to be moved counterclockwise by movement of the links 26. This results in elevating the support segments 22 to the overcenter elevated position illustrated in FIG. 2 for the support segments at stations A and B. It is assumed that all stations ahead of the station C are occupied and accordingly, the part sensors 36 thereat will occupy the position illustrated for the part sensor at station B in FIG. 1. Accordingly, the first support segment 22 which is moved to the overcenter elevated position illustrated in FIG. 2, is the support segment at the first station to the rear of the foremost unoccupied station.

Due to the abutment provided by the inclined ends 24 of adjacent support segments, all support segments to the rear of the foremost support segment which is moved to the overcenter elevated position are correspondingly moved to overcenter elevated position. At the same time, all support segments 22 located forwardly of the foremost support segment which is cammed to elevated overcenter position by a part sensor, are left in idle or lower position.

As previously noted, while fluid pressure may continue to urge the transfer bar 14 to the right as viewed in FIG. 2, this movement is prevented by engagement between the stop 48 and the roller 52.

Figure 3:
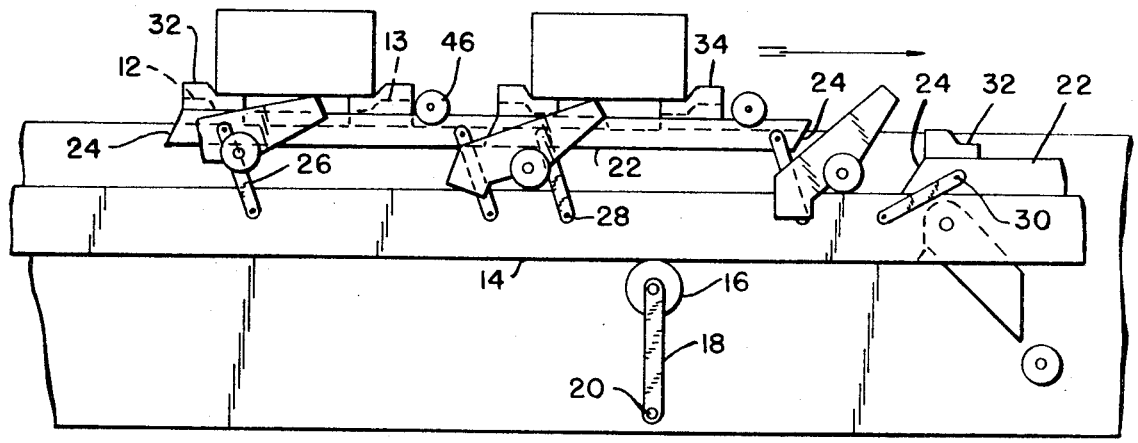

At this time the transfer bar 14 is moved to the elevated position illustrated in FIG. 3 by clockwise swinging movement of the arms 18 carrying the support rollers 16 thereon. This initial upward movement of the transfer bar is strictly vertical as controlled by the vertical surface 50 on the stop 48. During the upward movement of the transfer bar 14 those work supports which have been shifted to elevated overcenter position, such as those illustrated at stations A and B in FIG. 3, are moved into contact with the workpieces W and raise them to positions clear of the work locating and supporting elements 12 and 13. When the stop 50 has cleared the roller 52 the transfer bar 14 resumes its movement to the right carrying the workpieces from the stations at which they were previously located to the next station in advance. Suitable stop means are provided to terminate transfer movement of the bar 14 and when it has reached the limit of its transfer movement, the arms 18 carrying the rollers 16 are swung counterclockwise from the position illustrated in FIG. 3 to the position illustrated in FIGS. 1 and 2, thus lowering the workpieces onto the work locating and supporting means on the frame at the next succeeding station.

It will be observed that when the rollers 46 carried by the support segments 22 are swung by engagement with the blocks 44 to the elevated overcenter position, they are located above the blocks 44 and thus are free to move with the transfer bar during the forward transfer stroke. It will of course be appreciated that the overcenter elevated position of the support segments is determined by suitable stop means such for example as stops 58 carried by the frame and engageable with the links 26.

It will further be observed that the rollers 46 on the support segments 22 are located substantially above the cam blocks 44 of the sensors 36 when the transfer bar 14 is in elevated position. To allow for the return stroke after the transfer bar has been lowered by appropriate movement of the rollers 16, the rollers may engage the inclined forwardly facing surface of the block 44 at stations occupied by work pieces, thus camming the parts sensor 36 out of the way.

As the return stroke of the transfer bar 14 is completed, the abutments 54 and 56 on the frame and rearmost support segment 22 engage, swinging the support segment clockwise, which movement is imparted to all support segments which are in elevated overcenter position and which are located forwardly of the rearmost support segment. This will restore all parts to the position for the next succeeding cycle. Return movement of the transfer bar 14 to the left as seen in FIG. 1, causes the stop 48 to engage the roller 52 which in turn causes the stop to swing counterclockwise away from the abutment 53a as it passes the roller, thus leaving the parts in position for the next succeeding cycle.

What we claim as our invention is:

1. An accumulating conveyor comprising an elongated stationary support having work support stations spaced therealong, a transfer bar mounted for reciprocation parallel to said elongated support, and for vertical movement relative thereto, a plurality of work supports on said bar independently movable thereon between idle and work carrying positions, said work supports having end portions arranged to abut end portions of adjacent work supports so that movement of any one work support in either direction is operable to assure that all work supports located in the direction of movement of said one work support occupy the same relative position as that to which said one work support is moved, work sensors at each station, feed means connected to said bar to move said bar horizontally from a rest position in an initial movement of a part advancing cycle, means operable between the sensor at any empty station and the work support next in rear of such empty station and operable as a consequence of initial movement of said bar from a rest position to shift the last mentioned work support from idle to work carrying position and to locate each work support in work carrying position beneath one of said stations, movement of said one work support from idle to work carrying position being operable as a consequence thereof to move all work supports in rear of said one work support to work carrying positions, lift means operable thereafter to elevate said bar to cause all work supports in work carrying position to lift workpieces from the stations above said work supports in work carrying position, said feed means being operable thereafter to advance said bar to position each work support in work carrying position and the workpiece carried thereby over the next forward station, said lift means being then operable to lower said bar to deposit the workpieces at stations along said stationary support, said feed means being then operable to return said bar rearwardly.

2. A conveyor as defined in claim 1 in which said work supports are each connected to said bar by parallel links.

3. A conveyor as defined in claim 2 in which said work supports each comprises an abutment positioned to engage a part sensor in the position which a part sensor occupies at an empty station.

4. A conveyor as defined in claim 3, said work supports being movable by engagement with a part sensor or by movement of an adjacent work support into an elevated overcenter position which clears the part sensor to provide for further forward movement of said work supports.

5. A conveyor as defined in claim 1 in which each station is provided on said elongated support by work locating and supporting elements thereon.

6. A conveyor as defined in claim 5 in which each work support comprises a segment having work locating and supporting elements thereon similar to such elements on said elongated support at each station.

7. A conveyor as defined in claim 1 in which initial horizontal movement of said transfer bar in a part advancing cycle is forwardly from a rearmost rest position, stop means engageable by said bar to arrest forward movement thereof in a predetermined position, upward movement of said bar being effective to clear said stop means to provide for further advance of said bar after workpieces have been picked up by the work supports in work carrying position.

8. A conveyor as defined in claim 7 in which said stop means has a vertical rearwardly facing surface engageable by said bar to require vertical movement of said bar to precede further forward movement thereof.

9. A conveyor as defined in claim 8 in which the feed means comprises a nonpositive means to maintain pressure between said bar and stop means during upward movement of said bar and then to resume forward movement of the bar.

10. A conveyor as defined in claim 1 comprising abutment means acting between said stationary support and the rearmost of said work supports to move said rearmost work support to idle position upon rearward movement of said bar to rest position, such movement of the rearmost work support effecting corresponding movement of all work supports forwardly thereof.